Dec. 11, 1962  R. S. RANSOM  3,068,030
LATCHING AND SECURING MEANS FOR COMPONENT
SECTIONS OF A TUBULAR BODY
Filed Jan. 4, 1960  2 Sheets-Sheet 1

Dec. 11, 1962 R. S. RANSOM 3,068,030
LATCHING AND SECURING MEANS FOR COMPONENT
SECTIONS OF A TUBULAR BODY
Filed Jan. 4, 1960 2 Sheets-Sheet 2

Richard S. Ransom
Inventor
By Cushman, Darby & Cushman
Attorneys 3,068,030
LATCHING AND SECURING MEANS FOR COMPONENT SECTIONS OF A TUBULAR BODY
Richard Sutton Ransom, Holywood, County Down, Northern Ireland, assignor to Short Brothers and Harland Limited, Belfast, Northern Ireland
Filed Jan. 4, 1960, Ser. No. 256
Claims priority, application Great Britain Mar. 31, 1959
5 Claims. (Cl. 287—54)

The invention is directed to the provision of means for latching together and securing against relative axial displacement the component sections of a body when assembled in end-to-end relationship. It is desirable that such latching and securing means should be capable of being released quickly to provide speedy access to the interior of the body, that it should be capable of taking up tolerance variations in dimensions of the relative sections, that it should have no loose parts which will be subject to loss or displacement when the sections are disconnected, and that it should be adapted to provide a self-latching temporary engagement of component sections as offered to each other in course of assembly, such that the sections will be securely held together pending a subsequent tightening operation.

These requirements are satisfied by the latching and securing means provided in accordance with this invention which comprise at each joint one or more latch-members mounted on one section, said latch-members being yieldable towards and away from abutments respectively provided on the adjoining section, each latch-member and its companion abutment having contacting faces which are so inclined as to constitute cooperating wedges which, when the latch-member is tightened after engagement, tend to draw the sections more closely together.

Said latch-members are so arranged that when one section is presented to the adjoining section they releasably engage the abutments thereon. Means are provided for tightening each latch-member in the engaged position and for holding it positively engaged.

In a modified embodiment of the invention two sections of the body are joined to opposite ends of a short intermediate carrier section which carries one or more latch-members of duplex form and adapted to engage at each end with an abutment on the adjoining section.

Two embodiments of the invention will now be described by way of example with reference to the accompanying drawings in which.

Figure 1:
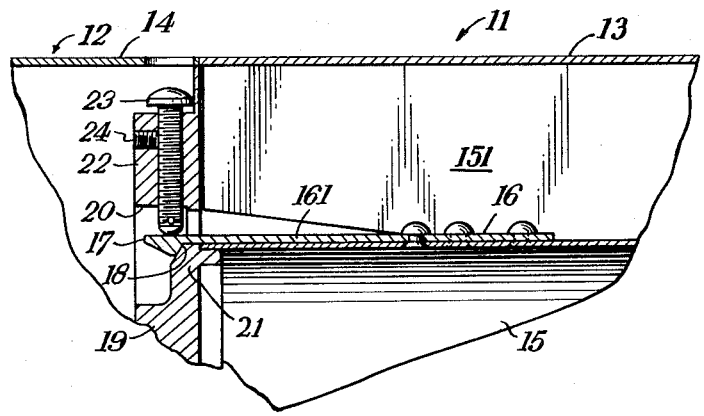
FIG. 1 is a cross-sectional part side elevation of two component sections of a tubular body secured together by latching and securing means according to the first embodiment of the present invention.
Figure 2:
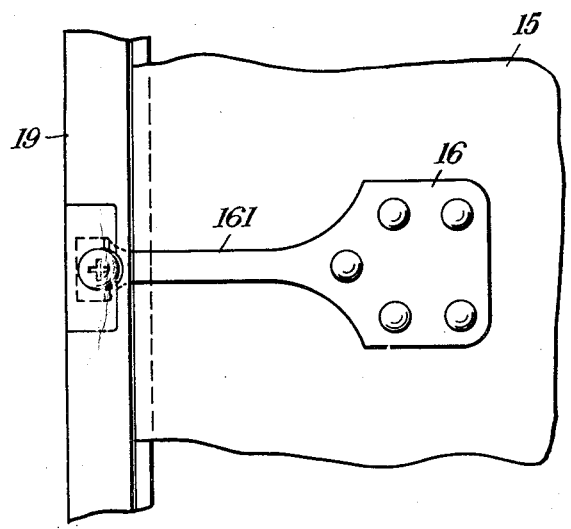
FIG. 2 is a plan view of the body shown in FIG. 1, with the outer shell removed.
Figure 3:
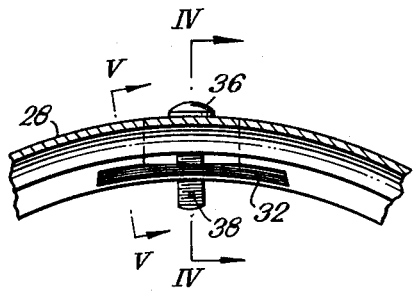
FIG. 3 is a cross-sectional part end elevation of a tubular body, with latching and securing means according to a second embodiment of the invention.
Figure 4:
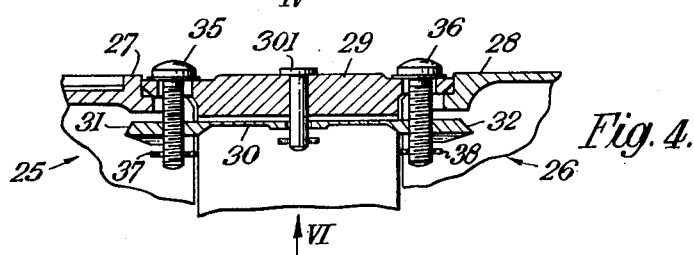
FIG. 4 is a cross-sectional part side elevation of the body shown in FIG. 3 taken on the line IV—IV of FIG. 3.
Figure 5:
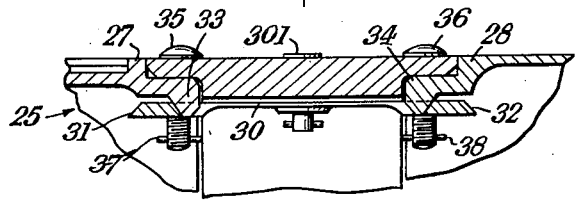
FIG. 5 is a cross-sectional part side elevation of the body shown in FIG. 3, taken on the line V—V in FIG. 3.
Figure 6:
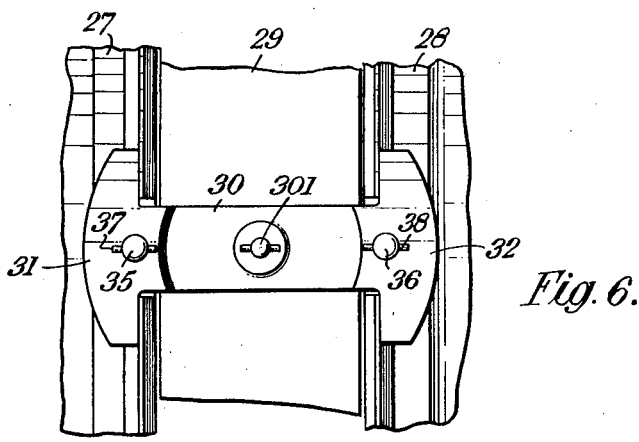
FIG. 6 is a plan view of the body shown in FIG. 4, viewed in the direction of the arrow VI.

Referring first to FIGS. 1 and 2, two adjacent component sections 11 and 12 with outer cylindrical shells 13 and 14 are joined together to form a substantially cylindrical casing, different sections of which are used for housing the several mechanisms or instrumental assemblies of a composite apparatus. The structure of the section 11 in the region of the joint includes a concentric cylindrical frame 15 upon an outer face of which there are mounted in substantially equiangular spacing four latch-members 16. Conveniently, the inner shell 15 is joined to the outer shell 13 by longitudinally extending web plates 151 welded thereto. Each latch-member 16 takes the form of a metal blade which is broadened at one end and drilled to be secured by riveting to said cylindrical frame, so that the free end 161 extends parallel to the axis of the casing beyond the end of the section 11. The underside of the free end 161 of each latch-member 16 is fashioned with a projecting lug 17, the re-entrant face 18 of which is inclined for the purpose hereinafter explained.

The other section 12 includes in its structure a joint-ring 19 joined to the outer section 12 by any suitable means such as welding, and which is provided with apertures 20 at such positions that when offered to the end of the section 11 the latch-members 16 thereon pass through registering apertures of the joint-ring, so that the lug 17 on the underside of the latch-member engages behind an abutment 21 bordering the aperture 20.

Adjacent each aperture 20 of the joint-ring 19 there is provided a boss 22 thereof in which is screwed a setscrew 23 the end of which, when the setscrew is tightened, is effective to bear downwardly against the end 161 of the latch-member 16 and thus constitute a stop for holding the same in engagement with the joint-ring 19. A screwed nylon plug 24 provides frictional locking of the setscrew 23 in the tightened position.

By these means the two sections 11 and 12 are adapted to be latched together. The face of the abutment 21 on the joint-ring 19 which is engaged by the lug 17 on the latch-member 16 is inclined in like manner to the re-entrant face 18 of the latter, so that the effect of tightening the latch-members 16 by means of the setscrews 23 is to provide a wedging action tending to draw the sections 11 and 12 more closely together.

Referring now to FIGS. 3 to 6, in a second embodiment of the invention two sections 25 and 26 are furnished with terminal joint-rings 27 and 28, and are joined to opposite ends of a short cylindrical carrier member 29, of the same diameter as the sections 25 and 26, and carrying on its interior face a number of double-ended latch-members 30 secured to the member 29 by pins 301, the free ends 31 and 32 of which members 30 project beyond both ends of the cylindrical carrier member 29.

The projecting ends 31 and 32 of the latch-members 30 are of approximately T-shaped outline so that being arranged to pass through correspondingly spaced apertures in the joint-rings 27 and 28, the branches of the T-portions engage behind rebated parts 33 and 34 of the joint-rings 27 and 28 and so hold the same in attachment to the carrier member 29.

The latch-members 30 are tightened in engagement with the joint-rings 27 and 28 by setscrews 35 and 36 mounted in the carrier member 29 with their screwed shanks engaging tapped holes in the latch-members 30. The action of tightening the setscrews 35 and 36 causes the latch-members 30 to be flexed, and the contacting faces of the T-portions 31 and 32 thereof and of the joint-rings 27 and 28 being inclined in a manner similarly to that already described with respect to the first-mentioned embodiment, the sections 27 and 28 are drawn towards the carrier member 29 and firmly secured thereto. Locking pins 37 and 38 are provided to retain the setscrews 35 and 36.

What I claim as my invention and desire to secure by Letters Patent is:
1. In combination, latching and securing means for a tubular body defined by first and second sections operative to be positioned in longitudinally aligned end-to-end relationship, said latching and securing means comprising: at least one latch member operatively carried by said first section adjacent the peripheral wall thereof and freely extending beyond the end thereof towards said second section, said second section including a cooperatively positioned abutment adjacent said latch member, and having an inclined surface facing inwardly towards the interior of said second section, said latch member being in the form of a transversely movable resilient blade, the free end thereof including a lug having a cooperatively inclined re-entrant surface, said abutment being so positioned with respect to said latch member that when the first section is offered thereto, said lug rides over said abutment and assumes an engaged position wherein said abutment is positioned between said lug and said first section and the inclined surfaces bear against one another, and means carried by said second section in transverse relationship to the longitudinal axis of said bodies and operative at a point closely adjacent said wedging surfaces for tightening said latch member in said engaged position to interlock said lug and said abutment and to provide a wedging action between the inclined faces to draw the adjoining sections more closely together.

2. Latching and securing means according to claim 1, wherein said means for tightening said latch-member in the engaged position includes a set screw which engages the latch-member to hold the latter in engagement with the abutment whereby said interlock and wedging action between the inclined faces are provided.

3. Latching and securing means according to claim 1 wherein said sections are of cylindrical configuration defining thereby a cylindrical body and a plurality of said latch-members are mounted with substantially equi-angular spacing around the body.

4. Latching and securing means according to claim 1 wherein said second section includes an intermediate carrier section; said latch member attached to said carrier section at a point intermediate its ends, the opposite free ends thereof projecting to the adjacent ends of both said first and second sections; said latch member further including a lug at the free end extending to said first section, and an abutment in said first section having an inclined surface facing inwardly towards the interior of said first section, the adjacent lug having an inclined re-entrant surface for engagement therewith, said tightening means operative to interlock both said lugs with the respective abutments in said first and second sections.

5. Latching and securing means according to claim 4, wherein said tightening means includes a screw located at each end of the latch-member and mounted on the intermediate carrier section, one screw being arranged to be received in a cooperating hole in each end of the latch-member so as to set up interlocking and wedging action by the screws pulling at the end of the latch-members.

References Cited in the file of this patent
UNITED STATES PATENTS

| | | |
|---|---|---|
| 10,504 | Hall | Feb. 7, 1854 |
| 280,599 | Gardner | July 3, 1883 |
| 373,825 | Gleich et al. | Nov. 29, 1887 |
| 960,445 | Tupper | June 7, 1910 |
| 1,326,345 | Horton | Dec. 30, 1919 |
| 1,783,541 | Hogg et al. | Dec. 2, 1930 |
| 1,783,654 | Kelsey | Dec. 2, 1930 |
| 1,957,933 | Brandl | May 8, 1934 |
| 2,109,108 | Fesler | Feb. 22, 1938 |
| 2,904,144 | Moore | Sept. 15, 1959 |
| 2,935,342 | Seamark | May 3, 1960 |